(12) United States Patent
Takubo et al.

(10) Patent No.: US 7,592,484 B2
(45) Date of Patent: Sep. 22, 2009

(54) METHOD FOR PRODUCING CARBONYL DIFLUORIDE

(75) Inventors: Seiji Takubo, Settsu (JP); Takuji Kume, Settsu (JP); Akinori Yamamoto, Settsu (JP); Chie Sawauchi, Settsu (JP); Hisako Nakamura, Settsu (JP)

(73) Assignee: Daikin Industries, Ltd., Osaka-shi (JP)

( * ) Notice: Subject to any disclaimer, the term of this patent is extended or adjusted under 35 U.S.C. 154(b) by 0 days.

(21) Appl. No.: 11/587,946

(22) PCT Filed: Apr. 26, 2005

(86) PCT No.: PCT/JP2005/007896

§ 371 (c)(1),
(2), (4) Date: Sep. 10, 2007

(87) PCT Pub. No.: WO2005/105668

PCT Pub. Date: Nov. 10, 2005

(65) Prior Publication Data

US 2008/0021243 A1    Jan. 24, 2008

(30) Foreign Application Priority Data

Apr. 28, 2004 (JP) ............................. 2004-133275

(51) Int. Cl.
C07C 51/58 (2006.01)
(52) U.S. Cl. .................................. 562/851
(58) Field of Classification Search ............... 562/851
See application file for complete search history.

(56) References Cited

U.S. PATENT DOCUMENTS

| | | | |
|---|---|---|---|
| 2,836,622 A | 5/1958 | Tullack | 260/544 |
| 3,088,975 A | 5/1963 | Fawcett | 260/554 |
| 3,404,180 A | 10/1968 | Cordes | 260/544 |
| 3,639,429 A | 2/1972 | Weinmayr | 260/348.5 |
| 5,648,530 A | 7/1997 | Webster | 562/849 |

FOREIGN PATENT DOCUMENTS

| | | |
|---|---|---|
| EP | 0310255 | 4/1989 |
| JP | 45-26611 | 9/1970 |
| JP | 54-158396 | 12/1979 |
| JP | 9-255596 | 9/1997 |
| JP | 09-255596 | 9/1997 |
| JP | 1997-255596 | 9/1997 |
| JP | 2003-313016 | 11/2003 |

OTHER PUBLICATIONS

Wechsberg et al; "Comparative Studies of the Catalytic Fluorination of Carbon Monoxide wit hElementary Fluorine;" J.Am.Chem.Soc. 91 (1969) pp. 4432-4436.
Abstract No. 132037x; Chemical Abstracts; vol. 93, No. 13 (1980) p. 621.
Kojima et al; "Photolysis of $CO_2$ with 158 nm ($F_2$) Laser. Reactivity of O('D) with $CH_4$, $CF_3H$, and $CF_3CH_3$;" Chemistry Letters (1992) pp. 1309-1312.
"Radiactive Forcing of Climate Change;" Climate Change 2001, The Scientific Basis, 188.
Wine et al; "Reactive and Non-reactive Quenching of O('$D_2$) By $COF_2$;" Chem. Physics Letters, vol. 96, No. 1 (Mar. 25, 1983) pp. 129-132.
Ruff et al; "Das Glelchgewichf $2COF_2$... $CF_4{}^1$;" :Zeitschrift fur Anorganische und Allgemeine Chemie, vol. 242 (1939) pp. 272-276.
Taiwan Office Action dated Jul. 4, 2006.
International Search Report dated Aug. 16, 2005.
Supplementary European Search Report dated Jun. 17, 2009.

*Primary Examiner*—Sikarl A Witherspoon
(74) *Attorney, Agent, or Firm*—Kratz, Quintos & Hanson, LLP

(57) ABSTRACT

The present invention relates to a method for producing carbonyl difluoride comprising a step of reacting trifluoromethane with oxygen or an oxygen-containing gas while heating.

17 Claims, 2 Drawing Sheets

METHOD FOR PRODUCING CARBONYL DIFLUORIDE

TECHNICAL FIELD

The present invention relates to a method for producing carbonyl difluoride.

BACKGROUND OF THE INVENTION

Carbonyl difluoride is a useful material having various uses such as a material for fluoroorganic compounds, a cleaning gas for use in fabricating semiconductors, etc.

Examples of known methods for producing carbonyl difluoride using carbon monoxide as a starting material include methods wherein carbon monoxide is subjected to electrolytic fluorination (Patent Document 1), and wherein carbon monoxide is directly fluorinated using fluorine gas (Non-Patent Document 1). Examples of known methods using phosgene as a starting material include methods wherein phosgene is fluorinated using hydrogen fluoride in the presence of solvent, phosgene is fluorinated using hydrogen fluoride in the presence of solvent and triethylamine (Patent Document 2), phosgene is fluorinated using sodium fluoride in a solvent (Patent Document 3), and phosgene is fluorinated in the vapor phase using hydrogen fluoride together with an activated carbon catalyst (Patent Document 4). It is also known that carbonyl difluoride can be produced by reacting tetrafluoroethylene (TFE) with oxygen (Patent Document 5).

However, electrolytic fluorination and direct fluorination, which are methods for producing carbonyl difluoride using carbon monoxide as a starting material, require an expensive electrolytic vessel and/or a large facility for controlling the large amount of reaction heat, and are thus not preferable for industrial use. In electrolytic fluorination of carbon monoxide, $CF_4$ and $CF_3OF$ are produced as byproducts, and in direct fluorination of carbon monoxide, $CF_3OF$ and like peroxides are generated as byproducts. Furthermore, the selectivity for carbonyl difluoride is low. Among the methods using phosgene, particularly in methods wherein phosgene is fluorinated using hydrogen fluoride in the presence of solvent, and methods wherein phosgene is fluorinated using hydrogen fluoride and an activated carbon catalyst, it is difficult to separate the generated carbonyl difluoride from hydrogen chloride because they have a small difference in boiling points (about 1° C.). In methods wherein phosgene is fluorinated using hydrogen fluoride in the presence of solvent and triethylamine or methods wherein phosgene is fluorinated using sodium fluoride in the presence of solvent, carbonyl difluoride can be obtained without generation of hydrogen chloride, but large amounts of triethylamine hydrochloride and sodium chloride are generated and therefore waste treatment and/or reuse/recycling thereof is necessary.

The reaction wherein TFE is oxidized using oxygen generates an extremely large amount of reaction heat, and therefore there is a risk of an explosion.

Furthermore, it is difficult to obtain large amounts of carbon monoxide, phosgene, and TFE, as are used in the above-mentioned production methods, because they are toxic and/or unstable, and careful handling is required.

Examples of readily obtainable materials include chlorodifluoromethane (HCFC22), and trifluoromethane (HFC23). Known production methods using these starting materials include: reacting HCFC22 or like monohalo-difluoromethane with oxygen (Patent Document 6), and reacting HCFC22 with ozone (Non-Patent Document 2). It is also known, although not as a production method, that carbonyl difluoride can be generated by reacting HFC23 with $O(^1D)$, which is an electronically excited oxygen atom (Non-Patent Document 3).

In Patent Document 6, generation of carbonyl difluoride was confirmed but not quantified. Patent Document 6 nowhere discloses what byproducts were generated. In Non-Patent Document 2, in addition to carbonyl difluoride, HCl, $Cl_2$, and unidentified byproducts are generated. Here, the obtained HCl has a boiling point near that of carbonyl difluoride, and therefore it is difficult to separate the HCl from the carbonyl difluoride. HFC23 is a trihalogenated methane similar to HCFC22; however, it is known that HFC23 does not cause generation of HCl as a byproduct, because it does not contain chlorine, and the reactivity of HFC23 is very different from that of HCFC22. For example, their lifetimes in air according to the IPCC (evaluated based on the reaction speed with an OH radical, which is an oxidizing agent stronger than $O_2$) (Non-Patent Document 4) are as follows. The lifetime of HCFC22 is 11.9 years, that of HFC23 is 260 years, and that of $CHBrF_2$, which is an example of another trihalogenated methane, is 7 years. It is known that, compared to other trihalogenated methanes, HFC23 has an extremely low reactivity. Therefore, it is impossible to predict that carbonyl difluoride can be formed from HFC23 using the same methods as disclosed in Patent Document 6 and Non-Patent Document 2. The method disclosed in Non-Patent Document 3 uses a reaction with highly excited oxygen, and is fundamentally different from that of the present invention. Furthermore, it is industrially difficult to put the method disclosed in Non-Patent Document 3 to practical use, and, as with Patent Document 6, quantification was not conducted. According to Non-Patent Document 3, $CO_2$ is excited by laser, $O(^3P)$ is generated in addition to $O(^1D)$, and $O(^3P)$ does not relate to the reaction with HFC23. It is known that $O(^1D)$ generates carbonyl difluoride by reacting with HFC23, and is then changed to $O(^3p)$ by being deactivated due to collision with the generated carbonyl difluoride (Non-Patent Document 5). This is not very efficient reaction. It is also known that $O(^1D)$ reacts with carbonyl difluoride and some portion thereof decomposes into $CO_2$ and $F_2$ (Non-Patent Document 5); however, because $F_2$ is more oxidative than $O_2$, when carbonyl difluoride is reacted with $O_2$, carbonyl difluoride does not decompose into $CO_2$ and $F_2$.

As described above, many methods for producing carbonyl difluoride, including methods using fluorinated methane compounds as starting materials, have been published; however, a reaction achieving a high yield through a simple method has not yet been founded.

[Patent Document 1] Japanese Examined Patent Publication No. S45-26611

[Patent Document 2] Japanese Unexamined Patent Publication No. S54-158396

[Patent Document 3] U.S. Pat. No. 3,088,975

[Patent Document 4] U.S. Pat. No. 2,836,622

[Patent Document 5] U.S. Pat. No. 3,639,429

[Patent Document 6] EP0310255

[Non-Patent Document 1] J. Am. Chem. Soc., Vol. 91, (1969) pp. 4432-4436

[Non-Patent Document 2] Chemical Abstracts Vol. 93, No. 13, (1980), p. 621 Abstracts No. 132037x

[Non-Patent Document 3] Chemistry Letters (1992), pp. 1309-1312

[Non-Patent Document 4] Climate Change 2001: The Scientific Basis

[Non-Patent Document 5] Chemical Physics Letters Vol. 69, (1983), pp. 129-132

[Non-Patent Document 6] Zeitschrift fur Anorganische und Allgemeine Chemie Vol. 242, (1939), pp. 272-276

SUMMARY OF THE INVENTION

Problem to be Solved by the Invention

The present invention provides an economical method for providing carbonyl difluoride, which is useful for various purposes such as a material for fluoroorganic compounds, a cleaning gas for fabricating semiconductors, etc.

Means for Solving the Problem

The present inventors conducted extensive research to achieve the above object and found that carbonyl difluoride can be obtained in high yield by reacting trifluoromethane with oxygen (oxygen gas, or air, oxygen-enriched air or like oxygen-containing gas) while heating. Furthermore, by using a corrosion resistive reaction vessel, the amount of byproduct $CO_2$ can be greatly reduced.

The present invention provides the following methods:

1. A method for producing carbonyl difluoride comprising the step of reacting trifluoromethane with oxygen gas or an oxygen-containing gas while heating.

2. A method for producing carbonyl difluoride according to Item 1, wherein the reaction temperature is in the range of from 100° C. to 1500° C.

3. A method for producing carbonyl difluoride according to Item 1 or 2, wherein the oxygen-containing gas is air or an oxygen-enriched gas having a higher oxygen content than air.

4. A method for producing carbonyl difluoride according to any one of Items 1 to 3, wherein the amount of byproduct $CO_2$ is reduced by reacting trifluoromethane with the oxygen gas or oxygen-containing gas in a corrosion resistive reaction vessel.

5. A method for producing carbonyl difluoride according to any one of Items 1 to 4, wherein the reaction is conducted in the presence of a catalyst.

6. A method for producing carbonyl difluoride by reacting trifluoromethane with oxygen gas or an oxygen-containing gas in a reaction vessel while heating comprising the steps of:

(i) increasing the pressure of raw product gas generated in the reaction vessel using a compressor if necessary, cooling the raw product gas in a cooler, separating the resulting gas into an oxygen-rich gas and a liquid component, and returning the oxygen-rich gas to the reaction vessel; and (ii) distilling the liquid component separated from the oxygen-rich gas in Step (i) by using a distillation column, collecting highly purified carbonyl difluoride, and returning concentrated trifluoromethane to the reaction vessel.

7. A method for producing carbonyl difluoride by reacting trifluoromethane with oxygen gas or an oxygen-containing gas in a reaction vessel while heating comprising the steps of:

(i) increasing the pressure of raw product gas generated in the reaction vessel using a compressor if necessary, cooling the raw product gas in a cooler, and removing HF by liquefaction;

(ii) further increasing the pressure of the gas not liquefied in Step (i) using a compressor if necessary, cooling the gas in a cooler, separating an oxygen-rich gas from a liquid component, and returning the oxygen-rich gas to the reaction vessel; and (iii) distilling the liquid component separated in Step (ii) by using a distillation column, collecting highly purified carbonyl difluoride, and returning concentrated trifluoromethane to the reaction vessel.

Effect of the Invention

The present invention makes it possible to efficiently produce carbonyl difluoride. HFC23 used as a raw material in the present invention is a greenhouse gas. However, because it can be obtained as a byproduct of HCFC22, which is used as a cooling medium or a raw material for TFE, and some HFC23 is used as an etching gas but most is incinerated, fully utilizing such HFC23 is economically and environmentally very meaningful.

BEST MODE FOR CARRYING OUT THE INVENTION

The reaction of the present invention is expressed by the chemical reaction as below.

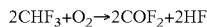

$$2CHF_3 + O_2 \rightarrow 2COF_2 + 2HF$$

There is no limitation to the method for conducting the present reaction, and a standard vapor phase reaction method can be employed. In other words, the method is for continuously or batchwisely producing a raw product by continuously or batchwisely supplying trifluoromethane (which may be referred to as "HFC23") and oxygen gas/oxygen-containing gas to a heated reaction chamber. In many cases, the raw product contains $CO_2$ (byproduct) in addition to carbonyl difluoride and HF, but, depending on the reaction conditions, sometimes the raw product contains a large amount of unreacted HFC23 and/or oxygen, and sometimes very little $CO_2$, and/or small amounts of other byproducts.

Compounds contained in the raw product other than carbonyl difluoride can be separated by distillation, etc., if necessary. Compounds other than the separated carbonyl difluoride, such as unreacted HFC23 and oxygen (carbonyl difluoride may be additionally included) can be reused/recycled in the reaction system. Therefore, there is no problem even if a large amount of carbonyl difluoride is included with these compounds when separated from carbonyl difluoride. Furthermore, materials having a boiling point greatly different from that of carbonyl difluoride, such as HF and oxygen, can be separated without conducting separation using a cooling distillation, etc., by subjecting the raw product to compression and/or cooling. For example, HF and compounds having a boiling point higher than oxygen can be separated by selective liquefaction.

When air or oxygen-enriched air is used as oxygen, air or oxygen-enriched air can be separated, collected, reused, etc., in the same manner as oxygen.

With respect to the conditions for reacting HFC23 with oxygen (oxygen gas or oxygen-containing gas), the reaction proceeds faster and more efficiently when the reaction temperature is higher, but if the temperature is unduly high, $CO_2$ (byproduct) increases and is thus not preferable. Specifically, the reaction temperature is generally about 100° C. to about 1500° C., preferably about 300° C. to about 1000° C., and more preferably about 350° C. to about 700° C. If the reaction temperature is too low, the reaction speed becomes extremely slow and the reaction time is prolonged, and is thus not effective. Furthermore, if the reaction temperature is too high, not only the production of byproducts increases, but the lifetime of the reaction vessel also decreases due to corrosion, etc., and thus is also not preferable.

The reaction time varies depending on the reaction temperature, but is generally about 0.1 seconds to about 10 hours, preferably about 0.5 seconds to about 1 hour, and more preferably about 1 second to about 30 minutes. The longer the reaction time becomes, the more the reaction progresses, but an unduly long reaction time may result in heating more than necessary and is therefore inefficient. If the reaction time is too short, the reaction does not satisfactorily progress and separation of the generated carbonyl difluoride becomes difficult, and is thus also inefficient.

The proportion of HFC23 to oxygen ($O_2$) may be suitably selected, but the proportion of oxygen relative to 1 mole of HFC23 is generally about 0.01 moles to about 200 moles, preferably about 0.1 moles to about 100 moles, and more preferably about 0.5 moles to about 50 moles. Theoretically, 0.5 moles of oxygen reacts with 1 mole of HFC23, but even if the amount of oxygen is smaller than this, it does not cause any problem in the reaction. However, if the amount of oxygen is too small, the amount of carbonyl difluoride generated is also small, and this adversely affects efficiency. Using excessive oxygen is efficient because the reaction can be promoted and the amount of carbonyl difluoride generated is increased. Unreacted oxygen can be recycled by sending it back to the reaction system, but if the amount thereof is unduly large, the amount of oxygen to be recycled becomes too large. This necessitates a large facility, and is thus uneconomical.

Air and air whose oxygen concentration is increased by an oxygen-enriched membrane, etc., can be used as an oxygen-containing gas. There is no limitation to the oxygen concentration of such an oxygen-containing gas, as long as the reaction can proceed, but is generally in the range of from about 10% v/v to less than 100% v/v, and preferably from about 20% v/v to less than 100% v/v. There is no problem even if the oxygen concentration is lower than air.

It is preferable that water and $CO_2$ be removed from air before reaction by compression, cooling, and/or using an adsorbent. The proportion of oxygen to HFC23 when such air is used is the same as described above.

The reaction pressure can be suitably selected as either lower than standard atmospheric pressure, or not less than standard atmospheric pressure, but the higher the pressure becomes, the more efficient, and more preferable for the separation subsequently conducted. Specifically, the pressure is generally in the range of from −0.09 MPaG to 20 MPaG in gauge pressure, and preferably from standard atmospheric pressure to 20 MPaG for making the process simple, and more preferably from standard atmospheric pressure to 10 MPaG considering the pressure resistance of the vessel or like equipment.

The material(s) of the reaction vessel in the portion(s) contacting the reaction gas is important. As long as they can resist oxygen and HF at high temperatures, various kinds of metals and inorganic substances can be used, including iron, copper, and alloys containing large amounts of iron and/or copper; however, because $CO_2$ and CO are formed when these metals react with the generated carbonyl difluoride under oxygen atmospheres at high temperatures, the yield of carbonyl difluoride is decreased. Therefore, corrosion resistive materials, such as SUS316 and like stainless steels, HASTELLOY C and like Ni—Cr—Mo alloys, INCONEL600 and like Ni—Cr alloys, HASTELLOY B and like Ni—Mo alloys, MONEL400 and like Ni—Cu alloys and other nickel alloys, pure nickel, etc., are preferably used. Even stainless steel sometimes causes decomposition of carbonyl difluoride, and therefore Ni—Cr alloys, Ni—Mo alloys, Ni—Cr—Mo alloys, Ni—Cu alloys and like nickel alloys, and nickel and like highly corrosion resistive materials are more preferably used. In addition to the above-mentioned alloys, it is also possible to use iron and stainless steels as materials for the reaction vessel as long as they can resist an oxygen-containing atmosphere at high temperatures by coating the reaction vessel with sodium fluoride, potassium fluoride, calcium fluoride and like stable metal fluorides.

One of the main features of the present invention is that trifluoromethane is reacted with oxygen under a heated atmosphere; however, it is known that some portion of carbonyl difluoride decomposes into $CO_2$ and $CF_4$ when a nickel or platinum catalyst is used under a heated atmosphere (Non-Patent Document 6). Regardless that a nickel-based reaction vessel is used or nickel beads are placed in the reaction vessel, $CF_4$ is not formed due to decomposition of the generated carbonyl difluoride in the present invention, probably because the reaction is conducted in the presence of oxygen.

Likewise in a standard vapor phase reaction, a catalyst(s) may be used in the present invention. It is also possible to place pellets or beads in the reaction vessel as a heat-transmission medium. It is preferable that the materials for pellets or beads be selected from those that do not decompose carbonyl difluoride, such as sodium fluoride pellets, nickel beads, etc.

Examples of usable catalysts include ruthenium, rhodium, palladium, osmium, iridium, platinum, and silver, as well as fluorides of aluminum, manganese, iron, cobalt, nickel, copper, zinc, zirconium, molybdenum, silver, cadmium, tin, hafnium, rhenium, thallium, lead, bismuth, etc. These fluorides do not have to be fluorides when prepared, and may be chlorides, bromides, oxides, etc. For example, $CoCl_2$, $MnBr_2$, $MgCl_2$, $CuCl_2$, etc., are highly soluble in methanol, and therefore they can be readily supported on a carrier. The prepared catalyst can be fluorinated by contacting with $COF_2$, HF, etc., before or during the reaction. Catalysts in the platinum group are formed by supporting a metal halide on a carrier, and reducing it using hydrogen, etc., and the thus-obtained resultant catalysts are used in the reaction. Examples of usable carriers supporting such catalysts include NaF, KF and like alkali metal fluorides; and $MgF_2$, $CaF_2$, $BaF_2$ and like alkaline-earth metal fluorides.

The reaction in the present invention can be conducted by a production process, for example, as illustrated in FIGS. 1 and 2.

The production process illustrated in FIG. 1 can be conducted in such a manner as described below.

(1) The raw product gas released from the reaction vessel has its pressure raised using a compressor 1, if necessary. If the raw product gas has a satisfactorily high pressure, compression is unnecessary.

(2) The gas, having its pressure raised if necessary, is cooled in a cooler 1, and gases having boiling points higher than oxygen are liquefied and stored in a receiver 1. The liquid stored in the receiver 1 is supplied to a distillation step from a vapor phase portion or liquid phase portion in a form of gas or liquid. It is also possible to supply only a carbonyl difluoride-rich phase to the subsequent step, if HF and carbonyl difluoride are separated from each other by cooling the receiver 1.

(3) The gas not liquefied in the cooler 1 is a gas containing a large amount of oxygen and therefore returned to the reaction vessel after being controlled its pressure using a pressure regulating valve, etc.

(4) The liquid stored in the receiver 1 is supplied to the distillation step without modification, and then separated into highly purified carbonyl difluoride, a mixture of HFC23 and carbonyl difluoride, and concentrated HF. Of those, the mixture of HFC23 and carbonyl difluoride is returned to the reaction vessel. Depending on the proportions of the constituent components of the material supplied to the distillation step and the distillation conditions, highly purified carbonyl difluoride is usually obtained from the top portion of the column and a mixture of HFC23 and carbonyl difluoride is obtained from the middle portion of the column.

The process illustrated in FIG. 2 can be conducted in the following manner.

(1) The raw product gas released from the reaction vessel has its pressure raised using a compressor 1, if necessary, and is cooled in a cooler 1. HF, having a high boiling point, is liquefied and stored in a receiver 1. If the raw product gas has a satisfactorily high pressure, compression is unnecessary.

(2) The gas not liquefied in the cooler 1 has its pressure further raised by a compressor 2 and then cooled in a cooler 2. Almost all the gases having a boiling point higher than oxygen are liquefied and stored in a receiver 2.

(3) The gas not liquefied in the cooler 2 is a gas containing a large amount of oxygen and can therefore be returned to the reaction vessel after having its pressure controlled using a pressure regulating valve, etc.

(4) The liquid stored in the receiver 2 is supplied to the distillation step without modification, and then separated into highly purified carbonyl difluoride, a mixture of HFC23 and carbonyl difluoride, and concentrated HF. Of those, the mixture of HFC23 and carbonyl difluoride is returned to the reaction vessel. Depending on the proportions of the constituent components of the material supplied to the distillation step and distillation conditions, highly purified carbonyl difluoride is usually obtained from the top portion of the column and the mixture of HFC23 and carbonyl difluoride is obtained from the middle portion of the column.

In the embodiments shown in FIGS. 1 and 2, air or air whose oxygen concentration is increased by an oxygen-enriched membrane, etc., may be used instead of oxygen. In this case, it is preferable that impurities such water and carbon dioxide be reduced by absorption, compression, cooling, etc.

The raw product gas released from the reaction vessel may be used for heating raw materials via a heat exchanger.

If the pressure in the reaction vessel is satisfactorily high, the compressor is unnecessary.

EXAMPLES

Hereunder, the present invention is explained in detail with reference to Examples; however, the present invention is not limited to these Examples.

Example 1

Using a ring-shaped heater, a SUS316 reaction chamber (heating portion of about 30 cm) having an external diameter of ¾ of an inch was heated to a predetermined temperature while supplying nitrogen. HFC23 and oxygen were supplied at a specified flow rate at the same temperature. The reaction chamber had a gauge pressure of about 0.01 MPaG. The gas released from the reaction chamber was diluted with about 1 L/min nitrogen, and then analyzed by FTIR. Table 1 shows the evaluated conversion of trifluoromethane and selectivities for the product gas.

Examples 2 to 6

A reaction was conducted in the same manner as in Example 1 except that about 20 ml of NaF pellets (3 mm Φ×3 mm H) were placed in a heating portion of the reaction chamber. Table 1 shows the results.

Examples 7 to 9

Using a ring-shaped heater, a HASTELLOY C reaction chamber (heating portion of about 50 cm) having an inside diameter of about 2 cm was heated to a predetermined temperature while supplying nitrogen. At this temperature, HFC23 and oxygen were supplied at a specified flow rate. The reaction chamber had a gauge pressure of about 0.01 MPaG. The gas released from the reaction chamber was diluted with about 1 L/min nitrogen, and then analyzed by FTIR. Table 1 shows the evaluated conversion of trifluoromethane and selectivities for the product gas.

Examples 10 to 16

A reaction was conducted in the same manner as in Example 7 except that about 40 ml of nickel beads (2 mm Φ) were placed in a heating portion of the reaction chamber. Table 1 shows the results.

Examples 17 to 19

Using a ring-shaped heater, a nickel reaction chamber (heating portion of about 50 cm) having an external diameter of ⅜ of an inch was heated to a predetermined temperature while supplying nitrogen. At this temperature, HFC23 and oxygen were supplied at a specified flow rate. The reaction chamber had a gauge pressure of about 0.01 MPaG. The gas released from the reaction chamber was diluted with about 1 L/min nitrogen, and then analyzed by FTIR. Table 1 shows the evaluated conversion of trifluoromethane and selectivities for the product gas.

The residence times of the gases in the heating portions were calculated based on the volume of the heating portion, flow rate of raw material, and reaction temperature. The results are as follows: 18 seconds in Example 17, 12 seconds in Example 18, and 9 seconds in Example 19.

TABLE 1

| | Temperature (°C.) | Trifluoromethane (ml/min) | $O_2$ (ml/min) | Conversion of trifluoromethane (%) | Selectivity for carbonyl difluoride (%) |
| --- | --- | --- | --- | --- | --- |
| Example 1  | 518 | 14   | 14   | 86   | 80   |
| Example 2  | 520 | 14   | 14   | 88   | 88   |
| Example 3  | 460 | 14   | 14   | 83   | 89   |
| Example 4  | 491 | 22.6 | 5.7  | 51   | 87   |
| Example 5  | 480 | 5.5  | 22.7 | 76   | 75   |
| Example 6  | 540 | 28   | 28   | 67   | 60   |
| Example 7  | 550 | 5.2  | 10.6 | 91   | 99   |
| Example 8  | 600 | 5.2  | 20.5 | 97   | 99   |
| Example 9  | 600 | 5.2  | 10.6 | 97   | 98   |
| Example 10 | 600 | 5.2  | 10.6 | 98   | 97   |
| Example 11 | 700 | 5.2  | 10.6 | 99.9 | 87   |
| Example 12 | 520 | 18.3 | 35.9 | 99   | 99.8 |
| Example 13 | 520 | 26.9 | 27.1 | 98   | 99.6 |
| Example 14 | 420 | 17.1 | 33.3 | 91   | 99.9 |
| Example 15 | 380 | 17.1 | 33.3 | 81   | 99.9 |
| Example 16 | 350 | 5.2  | 5.2  | 64   | 99.9 |
| Example 17 | 450 | 10   | 20   | 90   | 99.8 |
| Example 18 | 450 | 15   | 30   | 52   | 99.8 |
| Example 19 | 450 | 20   | 40   | 5    | 97.6 |

From the results of the above Examples, it became clear that the HASTELLOY C reaction chamber is superior to the others.

The results also indicate that Examples 12 and 13 have excellent reaction temperatures (520° C.). Example 11 has a low selectivity because of its high reaction temperature. Examples 14 to 16 have high selectivities, but long reactions are necessary because of the low temperatures, and presumably this decreases the conversion of trifluoromethane.

From the above results, it can be concluded that a preferable reaction temperature is in the range of from 400° C. to 600° C. If the temperature is lower than this range, the conversion of trifluoromethane becomes low, and if the temperature is higher than this range, byproducts are generated and selectivity is reduced.

Example 20

A reaction chamber was heated to 520° C. in the same manner as in Example 10, and then HFC23 (5.2 ml/min), oxygen (10.1 ml/min), and nitrogen (39.8 ml/min) were supplied. The gas released from the reaction chamber was analyzed by FTIR without modification. The conversion of trifluoromethane and selectivity were evaluated and the results indicate that the conversion of trifluoromethane was 80%, and the selectivity for carbonyl difluoride was 99.5%.

Reference Example 1

Using a ring-shaped heater, a SUS316 reaction chamber (heating portion of about 20 cm) having an external diameter of ¾ of an inch wherein about 100 ml of NaF pellets were placed in the heating portion was heated to 520° C. while supplying nitrogen, and carbonyl difluoride (9 ml/min) and a mixture of oxygen/nitrogen (20/80 vol, 171 ml/min) were then supplied while maintaining the temperature. The gas released from the reaction chamber was analyzed by FTIR without modification, and formation of a small amount of $CO_2$ was confirmed. The inside of the reaction chamber was observed after completion of the reaction, wherein there was no change in the NaF pellets but corrosion was observed in the reaction chamber.

In contrast, decomposition of carbonyl difluoride into $CO_2$ can be reduced by using a reaction chamber of Ni—Cr alloy, Ni—Mo alloy, Ni—Cr—Mo alloy, Ni—Cu alloy or like nickel alloy, or nickel or like corrosion resistive material instead of an SUS316 reaction chamber.

Figure 1:
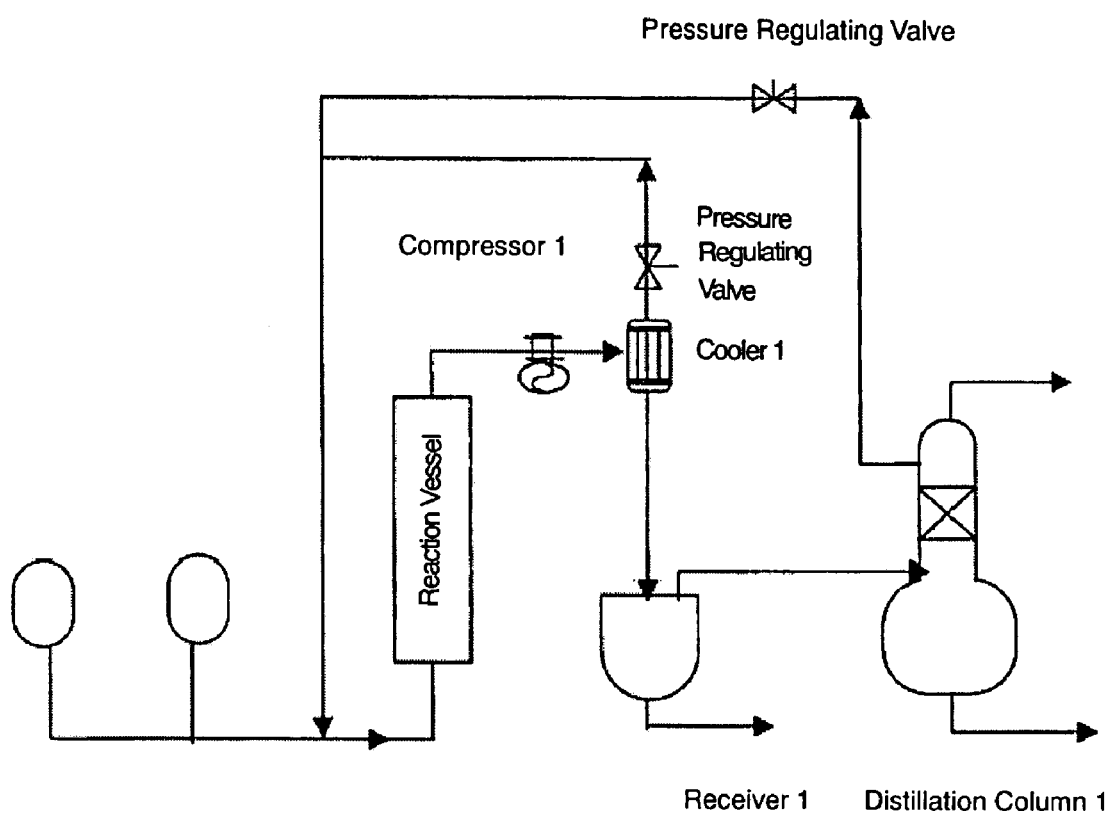
FIG. 1 shows one example of a $COF_2$ production process of the present invention.
Figure 2:
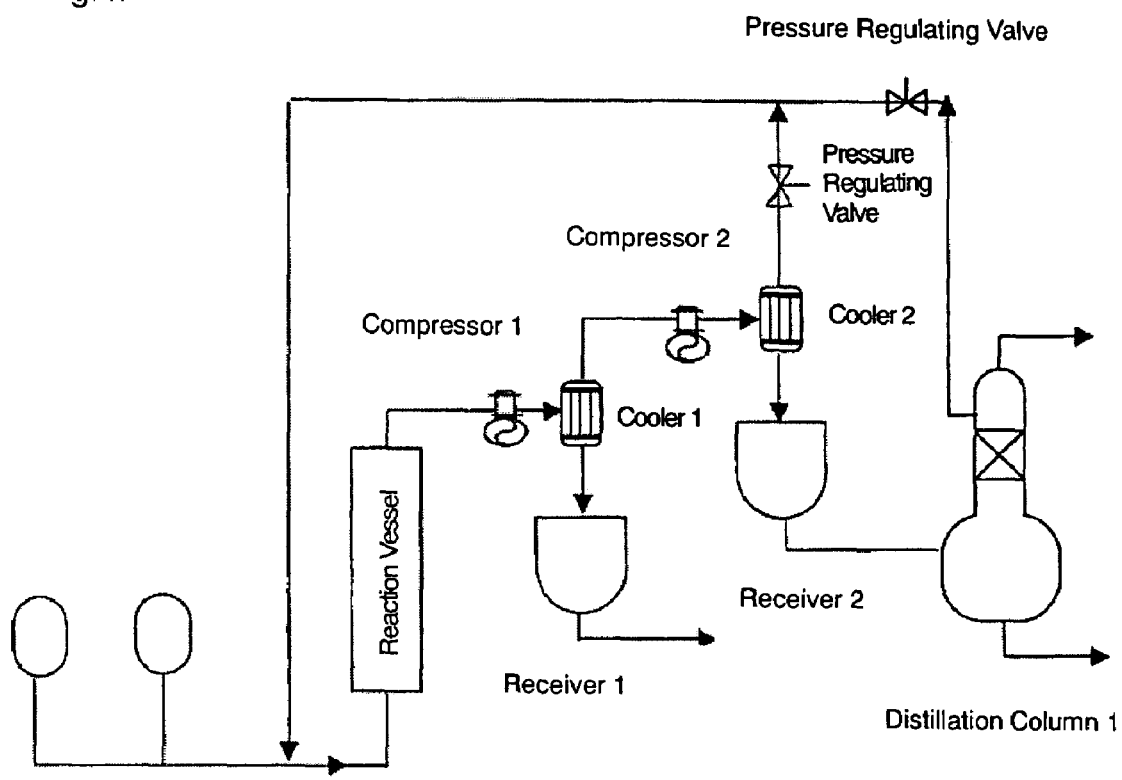
FIG. 2 shows another example of a $COF_2$ production process of the present invention.

We claim:

1. A method for producing carbonyl difluoride comprising the step of reacting trifluoromethane with oxygen gas or an oxygen-containing gas while heating a material of a reaction vessel in a portion contacting the reaction gas being a Ni—Cr alloy, a Ni—Mo alloy, a Ni—Cr—Mo alloy, Ni—Cu alloy or Ni.

2. A method for producing carbonyl difluoride according to claim 1, wherein the reaction temperature is in the range of from 100°C to 1500°C.

3. A method for producing carbonyl difluoride according to claim 2, wherein the oxygen-containing gas in air or an oxygen-enriched gas having a higher oxygen content than air.

4. A method for producing carbonyl difluoride according to claim 3, wherein the amount of byproduct $CO_2$ is reduced by reacting trifluoromethane with the oxygen gas or oxygen-containing gas in the reaction vessel.

5. A method for producing carbonyl difluoride according to to claim 4, wherein the reaction is conducted in the presence of a catalyst.

6. A method for producing carbonyl difluoride by reacting trifluoromethane with oxygen gas or an oxygen-containing gas in a reaction vessel while heating comprising the steps of:
(i) increasing the pressure of raw product gas generated in the reaction vessel using a compressor if necessary, cooling the raw product gas in a cooler, separating the resulting gas into an oxygen-rich gas and a liquid component, and returning the oxygen-rich gas to the reaction vessel; and
(ii) distilling the liquid component separated from the oxygen-rich gas in Step (i) by using a distillation column, collecting highly purified carbonyl difluoride, and returning concentrated trifluoromethane to the reaction vessel, a material of a reaction vessel in a portion contacting the reaction gas being a Ni—Cr alloy, a Ni—Mo alloy, a Ni—Cr—Mo alloy, Ni—Cu alloy or Ni.

7. A method for producing carbonyl difluoride by reacting trifluoromethane with oxygen gas or an oxygen-containing gas in a reaction vessel while heating comprising the steps of:
(i) increasing the pressure of raw product gas generated in the reaction vessel using compressor if necessary, cooling the raw product gas in a cooler, and removing HF by liquefaction;
(ii) further increasing the pressure of the gas not liquefied in Step (i) using a compressor if necessary, cooling the gas in a cooler, separating an oxygen-rich gas from a liquid component, and returning the oxygen-rich gas to the reaction vessel; and
(iii) distilling the liquid component separated from the oxygen-rich gas in Step (ii) by using a distillation column, collecting highly purified carbonyl difluoride, and returning concentrated trifluoromethane to the reaction vessel, a material of a reaction vessel in a portion contacting the reaction gas being a Ni—Cr alloy, a Ni—Mo alloy, a Ni—Cr—Mo alloy, Ni—Cu alloy or Ni.

8. A method for producing carbonyl difluoride according to claim 1, wherein the oxygen-containing gas in air or an oxygen-enriched gas having a higher oxygen content than air.

9. A method for producing carbonyl difluoride according to claim 8, wherein the amount of byproduct $CO_2$ is reduced by reacting trifluoromethane with the oxygen gas or oxygen-containing gas in the reaction vessel.

10. A method for producing carbonyl difluoride according to claim 9, wherein the reaction is conducted in the presence of a catalyst.

11. A method for producing carbonyl difluoride according to claim 1, wherein the amount of byproduct $CO_2$ is reduced by reacting trifluoromethane with the oxygen gas or oxygen-containing gas in the reaction vessel.

12. A method for producing carbonyl difluoride according to claim 11, wherein the reaction is conducted in the presence of a catalyst.

13. A method for producing carbonyl difluoride according to claim 2, wherein the amount of byproduct $CO_2$ is reduced by reacting trifluoromethane with the oxygen gas or oxygen-containing gas in the reaction vessel.

14. A method for producing carbonyl difluoride according to claim 13, wherein the reaction is conducted in the presence of a catalyst.

15. A method for producing carbonyl difluoride according to claim 1, wherein the reaction is conducted in the presence of a catalyst.

16. A method for producing carbonyl difluoride according to claim 2, wherein the reaction is conducted in the presence of a catalyst.

17. A method for producing carbonyl difluoride according to claim 3, wherein the reaction is conducted in the presence of a catalyst.

* * * * *